March 1, 1932.  E. A. GUSTAFSON  1,848,060
MOTOR CYCLE SPEEDOMETER DRIVE
Filed March 15, 1928

Inventor
Edwin A. Gustafson

By Blackmore, Spencer & Flint
Attorneys

Patented Mar. 1, 1932

1,848,060

UNITED STATES PATENT OFFICE

EDWIN A. GUSTAFSON, OF FLINT, MICHIGAN, ASSIGNOR TO A C SPARK PLUG COMPANY, OF FLINT, MICHIGAN, A COMPANY OF MICHIGAN

MOTOR CYCLE SPEEDOMETER DRIVE

Application filed March 15, 1928. Serial No. 261,929.

My invention relates to improved speedometer driving mechanism, especially adapted for use on motorcycles.

It has for an object the provision of a speedometer driving mechanism which is driven from the rear wheel of the motor cycle, and which is so designed that it may be easily mounted upon or removed from the wheel. The driving mechanism is mounted inside the brake drum where it will be protected from injury and also from dirt and water. It is mounted upon the support which normally serves as an anchor for the brake band and on which the brake actuating lever is pivoted. Thus the speedometer driving mechanism may be attached to the motorcycle without any great alteration or substitution of existing parts.

Another object is to so construct the driving mechanism that it is not necessary that it be assembled in exact relation to the wheel. This, of course, simplifies the work of mounting it and also compensates for manufacturing inaccuracies which are bound to occur.

A still further object is to mount the driving gears in a housing which is provided with sealing means to keep the dirt from getting into the inside of the housing or the grease from working out.

Figure 3:
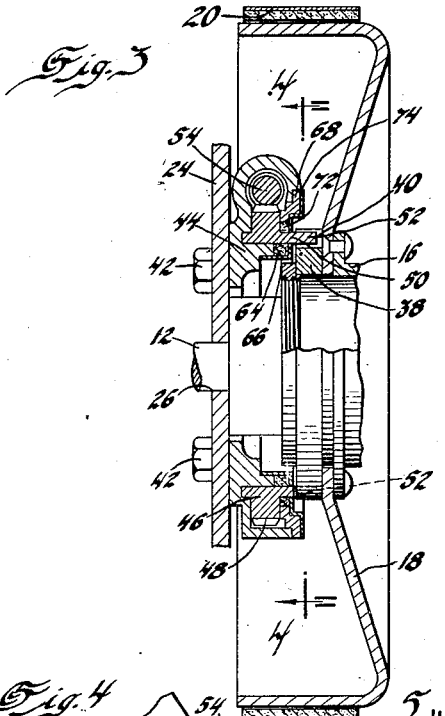
Figure 3 is a fragmentary sectional view through the brake drum showing the manner of mounting and driving the speedometer driving mechanism.
Figure 1:
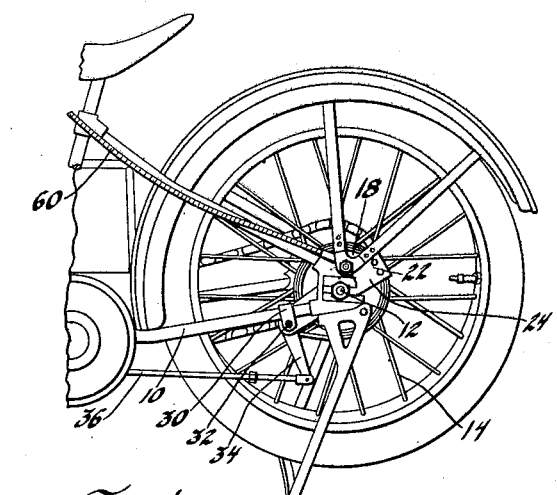
Figure 1 is a fragmentary view of the rear portion of a motorcycle, showing my improved speedometer drive mounted on the rear wheel.
Figure 4:
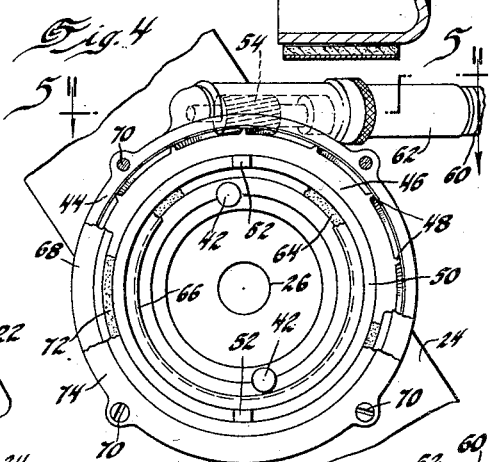
Figure 4 is a view taken on the line 4—4 of Figure 3, with the wheel removed to more clearly show the invention.
Figure 2:
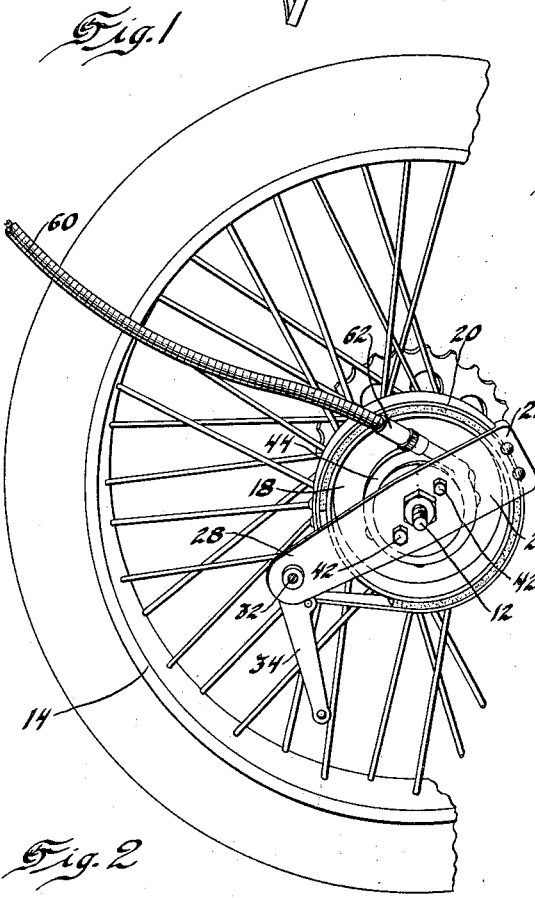
Figure 2 is a fragmentary view, on a larger scale, of the rear wheel, with the motorcycle frame removed to more clearly show my improved mounting.

The reference numeral 10 indicates the frame of a motorcycle in which is supported the rear axle 12. Journalled on this axle is the rear wheel 14 which is provided with a hub 16. Secured to the hub is a brake drum 18. A brake band 20 extends around the outside of the brake drum and is anchored at 22 to a support 24. This support has formed in it a central opening 26 which fits over a reduced portion of the shaft 12. In order to keep the support from turning about the center of the shaft 12, its outer end 28 is secured to the frame by a clamp 30. This clamp is held in place by a bolt 32, which also serves as a pivot for a brake actuating lever 34 which has connected to it both ends of the brake band 20. The opposite end of the actuating lever 34 is connected to the brake pedal in the usual manner by a rod 36, as shown in Figure 1.

Figure 5:
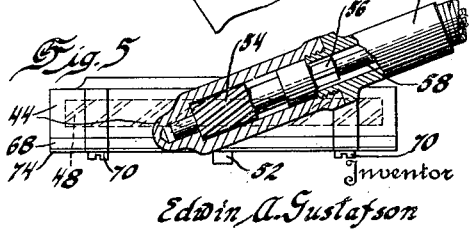
Figure 5 is a section taken on the line 5—5 of Figure 4.

Fastened to the brake drum 18 by welding or in any other suitable manner, is a driving ring 38 having formed in it two slots 40. Secured to the support 24 by bolts 42 is a housing 44 in which is journaled an annular driving gear 46 having worm teeth 48 cut in it. This gear has formed on it a flange 50 which extends outside the housing 44. On this flange are two tongues 52, which are adapted to fit into the slots 40 on the driving ring 38, for the purpose of driving the gear 46. A worm shaft 54, meshing with the gear 46 and driven by it, is also journaled in the housing 44. The end of this worm shaft 54 is adapted to receive a squared end 56 of a flexible shaft 58 which transmits the driving movement to the speedometer which is located at the forward part of the motorcycle. This flexible shaft is inclosed in a flexible casing 60, which has secured to it a sleeve 62 which is adapted to be threaded into the housing 44, as shown in Figure 5, to hold the flexible shaft and casing in place.

It is considered very essential that the dirt be kept out of the inside of the housing 44. To insure this, I have provided a packing 64 between the flange 50 and the housing 44. This packing is held in place by a stamping 66 which is pressed into the housing. A cover plate 68 serves to hold the gear 46 in the housing, and is fastened in place by screws 70 which are threaded into the housing. A packing 72 is secured between the cover 68 and the flange 50, being held in place by a stamping 74, which fits under the heads of the screws 70. It will be seen that the packings 64 and 72 will not only serve to keep dirt out of the housing, but also keep oil or grease, which is put into the housing upon assembly, from leaking out.

It will be seen that by mounting the housing 44 inside the brake drum, it will be protected from damage. It is not necessary to provide a separate support for the housing 44, since it can be readily secured to the support 24 by merely drilling two holes for the bolts 42. All that it is necessary to do in addition to drilling these holes, is to secure the driving ring 38 to the brake drum, I have thus provided a simple driving mechanism which may be easily attached to or removed from any motorcycle having a brake. By fastening the housing to the support 24, the whole assembly may be easily removed, and when replacing it, it is not necessary to make any delicate adjustments in order to insure that housing is in an exact relation to the wheel, since all that is necessary is that the tongues 52 fit into the slots 40. The amount of engagement of these two may vary considerably without affecting in any way the operation of the mechanism. This, of course, simplifies the installation of the drive, and also lowers manufacturing cost since the parts need not be machined so accurately.

It is thought from the foregoing taken in connection with the accompanying drawings, that the construction and operation of the device will be apparent to those skilled in the art, and that various changes in size, shape, and proportion and details of construction may be made without departing from the spirit and scope of the appended claims.

I claim:

1. In combination, a frame, an axle supported in said frame, a wheel journaled on said axle, a support secured to both said frame and said axle, a brake drum carried by said wheel, speedometer drive mechanism driven from and located within said brake drum, and a housing for said mechanism, said housing being secured to said support.

2. Instrument driving mechanism comprising a housing, an annular driving gear journaled in said housing, a flange formed on said gear and extending outside of said housing, a cover plate secured to said housing to hold said gear in place, and sealing means adapted to close the openings between said flange and said housing and between said flange and said cover plate.

3. Instrument driving mechanism comprising a frame, an axle supported in said frame, a wheel journaled on said axle, a support fastened to said frame and said axle, a brake drum secured to said wheel, an instrument driving gear driven from and located within said drum, and a housing for said gear, said housing being also secured to said support.

4. In combination, a frame, an axle supported in said frame, a wheel journalled on said axle, a support secured to said axle and said frame, and speedometer driving means mounted on said support and adapted to be driven from said wheel.

In testimony whereof I affix my signature.

EDWIN A. GUSTAFSON.